US008321714B2

(12) United States Patent
Wu et al.

(10) Patent No.: US 8,321,714 B2
(45) Date of Patent: Nov. 27, 2012

(54) SERIAL CONTROLLER AND BI-DIRECTIONAL SERIAL CONTROLLER

(75) Inventors: Ken Tang Wu, Hsinchu (TW); Cheng Jung Lee, Hsinchu (TW)

(73) Assignee: Macroblock, Inc., Hsinchu (TW)

( * ) Notice: Subject to any disclaimer, the term of this patent is extended or adjusted under 35 U.S.C. 154(b) by 294 days.

(21) Appl. No.: 12/908,625

(22) Filed: Oct. 20, 2010

(65) Prior Publication Data

US 2012/0017108 A1 Jan. 19, 2012

(30) Foreign Application Priority Data

Jul. 16, 2010 (TW) ............................... 99123578 A

(51) Int. Cl.
*G06F 13/42* (2006.01)
*H04L 7/00* (2006.01)

(52) U.S. Cl. ......................... 713/401; 375/354; 710/305

(58) Field of Classification Search .......... 713/400–401; 375/354–356, 362; 710/107, 305
See application file for complete search history.

(56) References Cited

U.S. PATENT DOCUMENTS

| | | | | |
|---|---|---|---|---|
| 5,371,880 | A * | 12/1994 | Bhattacharya | 713/400 |
| 5,481,563 | A * | 1/1996 | Hamre | 375/226 |
| 5,574,896 | A * | 11/1996 | Li et al. | 713/500 |
| 5,706,485 | A * | 1/1998 | Barkatullah et al. | 713/401 |
| 6,445,420 | B1 * | 9/2002 | Kim | 348/465 |
| 7,509,517 | B2 * | 3/2009 | Matsumoto et al. | 713/600 |
| 2003/0031282 | A1 * | 2/2003 | McCormack et al. | 375/355 |
| 2004/0172570 | A1 * | 9/2004 | Miyajiri | 713/400 |
| 2006/0112293 | A1 * | 5/2006 | Przybysz et al. | 713/400 |
| 2006/0294275 | A1 * | 12/2006 | Lambrache et al. | 710/110 |
| 2009/0323875 | A1 * | 12/2009 | Kossel | 375/354 |

* cited by examiner

*Primary Examiner* — Paul R Myers
*Assistant Examiner* — Trisha Vu
(74) *Attorney, Agent, or Firm* — Morris Manning & Martin LLP; Tim Tingkang Xia, Esq.

(57) ABSTRACT

A serial controller is adapted to receive an external clock and an input data, and output an inverted clock and an output data. The serial controller includes an inverter, a serial position detector, a synchronous clock generator, a serial register, and a half-cycle delay unit. Thereby, through the serial controller, the problem that the data signal and the driving clock are not synchronous when the clock series are inverted is avoided. Besides, a bi-directional serial controller further includes an identification unit and a data directing unit, and the serial controller is enabled to return the current status to a central control unit to serve as the reference for error detection.

15 Claims, 18 Drawing Sheets

SERIAL CONTROLLER AND BI-DIRECTIONAL SERIAL CONTROLLER

CROSS-REFERENCE TO RELATED APPLICATIONS

This non-provisional application claims priority under 35 U.S.C. §119(a) on Patent Application No(s). 099123578 filed in Taiwan, R.O.C. on Jul. 16, 2010, the entire contents of which are hereby incorporated by reference.

BACKGROUND OF THE INVENTION

1. Field of Invention

The present invention relates to a serial controller and a bi-directional serial controller, and more particularly to a serial controller and a bi-directional serial controller for synchronously transmitting data signals at all stages in a series with an inverted clock.

2. Related Art

In recent years, with the raising of the worldwide issue of energy-saving and reducing $CO_2$ emission, in the design of architectural outdoor illumination, decorative illumination, or scenario illumination for commercial purposes, light-emitting diodes (LEDs) are more widely used as illumination apparatus. For example, since the RGB cluster formed by red, blue, and green LEDs has diversified light and shadow changing effects, the RGB cluster is usually connected in series for different illuminators so as to form a strip screen, curtain display, or wall washer light of multilevel serial spot lights, which is applied in the long-distance light string.

Since this kind of illumination apparatus is usually designed according to the appearance of the building or different commercial requirements, when the range of appearance of the building demanding for illumination is large or the design of the illuminator is complicated, the designer needs to connect in series a large number of spot lights, LEDs, and the driving clocks thereof so as to form a long string of RGB cluster, thereby achieving a better illumination effect.

However, the problem of this serial RGB cluster lies in that the driving clock for driving the spot lights at each stage in the series is not a single global signal. That is to say, the driving clock of the spot lights at each stage is obtained from the driving clock of the spot lights in the previous stage. Therefore, regarding the signal of the driving clock at one stage in the series, when the duty cycle of the driving clock offsets due to the capacitance effect or accumulative effect generated in the transmission distance, e.g., the time of the signal of the driving clock at the high level is unequal to the time of the signal at the low level, and in this circumstance, for the serial RGB cluster formed by connecting multilevel spot lights in series, the signal waveform of the driving clock of the spot lights at the latter level is severely distorted due to the multilevel accumulative effect.

Moreover, since the distance between the spot lights at each stage is quite long in the serial RGB cluster, if errors occur to the driving circuit for driving the spot lights or to the LED of the spot lights at a certain stage, the data signal must be pulled back to the spot lights at the $1^{st}$ stage from the spot lights at the last stage, for carrying out the error detection. This method not only reduces the error detection efficiency of the serial RGB cluster, but also as abovementioned causes the waveform distortion of the driving clock.

SUMMARY OF THE INVENTION

In view of the above, the present invention is a serial controller, which not only drives and serially connects the spot lights at all stages but also solves the waveform distortion problem of the driving clocks of the spot lights at all stages in the series. The present invention is further a bi-directional serial controller for realizing bi-directional transmission of the data signals between the spot lights at all stages.

The present invention provides a serial controller, adapted to receive an external clock and an input data and output an inverted clock and an output data. The serial controller comprises an inverter, a serial position detector, a synchronous clock generator, a serial register, and a half-cycle delay unit.

The inverter receives the external clock and outputs the inverted clock.

The serial position detector outputs a position signal according to the external clock and the input data, wherein the position signal is an odd signal or an even signal.

The synchronous clock generator outputs a synchronous clock according to the position signal and the external clock. When the position signal is the odd signal, the synchronous clock and the external clock are in the same phase, and when the position signal is the even signal, the synchronous clock and the external clock are in the opposite phase.

The serial register receives and temporarily stores the input data according to the synchronous clock and then outputs the data.

The half-cycle delay unit receives the data from the serial register, delays the data by a half cycle of the synchronous clock, and outputs the data as the output data.

The present invention further provides a bi-directional serial controller, which comprises an inverter, an input contact, a serial position detector, a synchronous clock generator, a serial register, an identification unit, a half-cycle delay unit, an output contact, and a data directing unit.

The inverter receives and inverts an external clock and then outputs an inverted clock.

The input contact receives an input data.

The serial position detector outputs a position signal according to the external clock and the input data, wherein the position signal is an odd signal or an even signal.

The synchronous clock generator outputs a synchronous clock according to the position signal and the external clock. When the position signal is the odd signal, the synchronous clock and the external clock are in the same phase, and when the position signal is the even signal, the synchronous clock and the external clock are in the opposite phase.

The serial register has a receiving end and a transmitting end. The serial register stores the signal received by the receiving end according to the synchronous clock and then outputs the signal from the transmitting end.

The identification unit outputs a control signal according to the input data and the synchronous clock, wherein the control signal comprises a return command.

The half-cycle delay unit has an input point and an output point, wherein the input point is coupled to the transmitting end, and the half-cycle delay unit delays data from the input point by a half cycle of the synchronous clock and outputs the data from the output point.

When receiving the return command, the data directing unit couples the output contact to the receiving end and couples the output point to the input contact, and when not receiving the return command, the data directing unit couples the input contact to the receiving end and couples the output point to the output contact.

Therefore, according to the serial cluster formed by the serial controller of the present invention, the output data of the serial controllers at all stages are synchronously transmitted with the input data. Then, according to the bi-directional serial cluster formed by the bi-directional serial controller of the present invention, data of the bi-directional serial controllers at all stages may be bi-directionally transmitted (i.e., written into the next stage or read back from the next stage).

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1A:
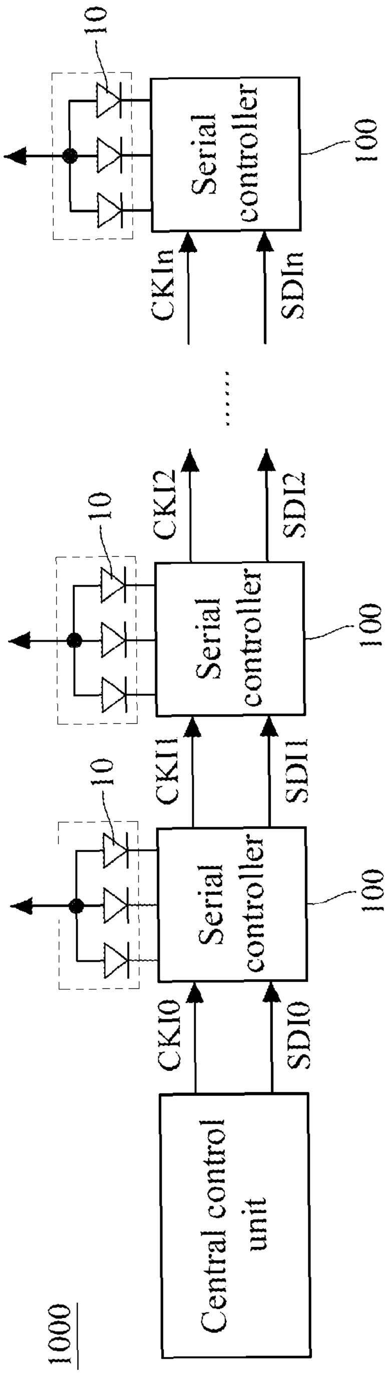
FIGS. 1A and 1B are schematic architectural views illustrating an application of a serial cluster according to a first embodiment of the present invention.
Figure 1B:
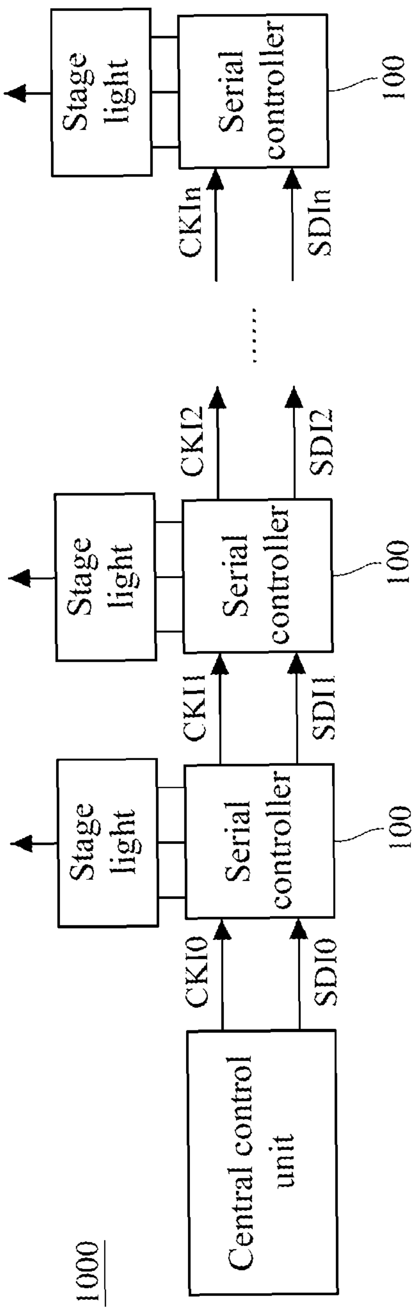

FIGS. 1A and 1B are schematic architectural views illustrating an application of a serial cluster according to a first embodiment of the present invention. A serial controller 100 is applied in the serial cluster 1000, in which the serial cluster 1000 comprises a plurality of serial controllers 100. The serial controller 100 of the first embodiment of the present invention can be used for driving LEDs 10 as shown in FIG. 1A or driving stage light controllers (for example, but not limited to, functions similar to DMX 512 controllers) as shown in FIG. 1B, and its application field is not limited thereto. For example, the serial cluster 1000 can not only be used for serially connecting and transmitting data signals SDI0, SDI1, SDI2, . . . , SDIn to each serial controllers 100, but also converting the data signals transmitted to each serial controllers 100 into pulse width modulation (PWM) signals, or light/dark signals, motor driving signals, and the like for driving the LEDs 10 or the stage lights.

In FIGS. 1A and 1B, the serial controller 100 at the $0^{th}$ stage of the serial cluster 1000 is connected to the central control unit and receives the data signal SDI0; and the serial controller 100 at the $1^{st}$ stage of the serial cluster 1000 is connected to the serial controller 100 at the $0^{th}$ stage, and takes the data signal SDI1 output by the serial controller 100 at the $0^{th}$ stage as its input data signal.

Figure 2:
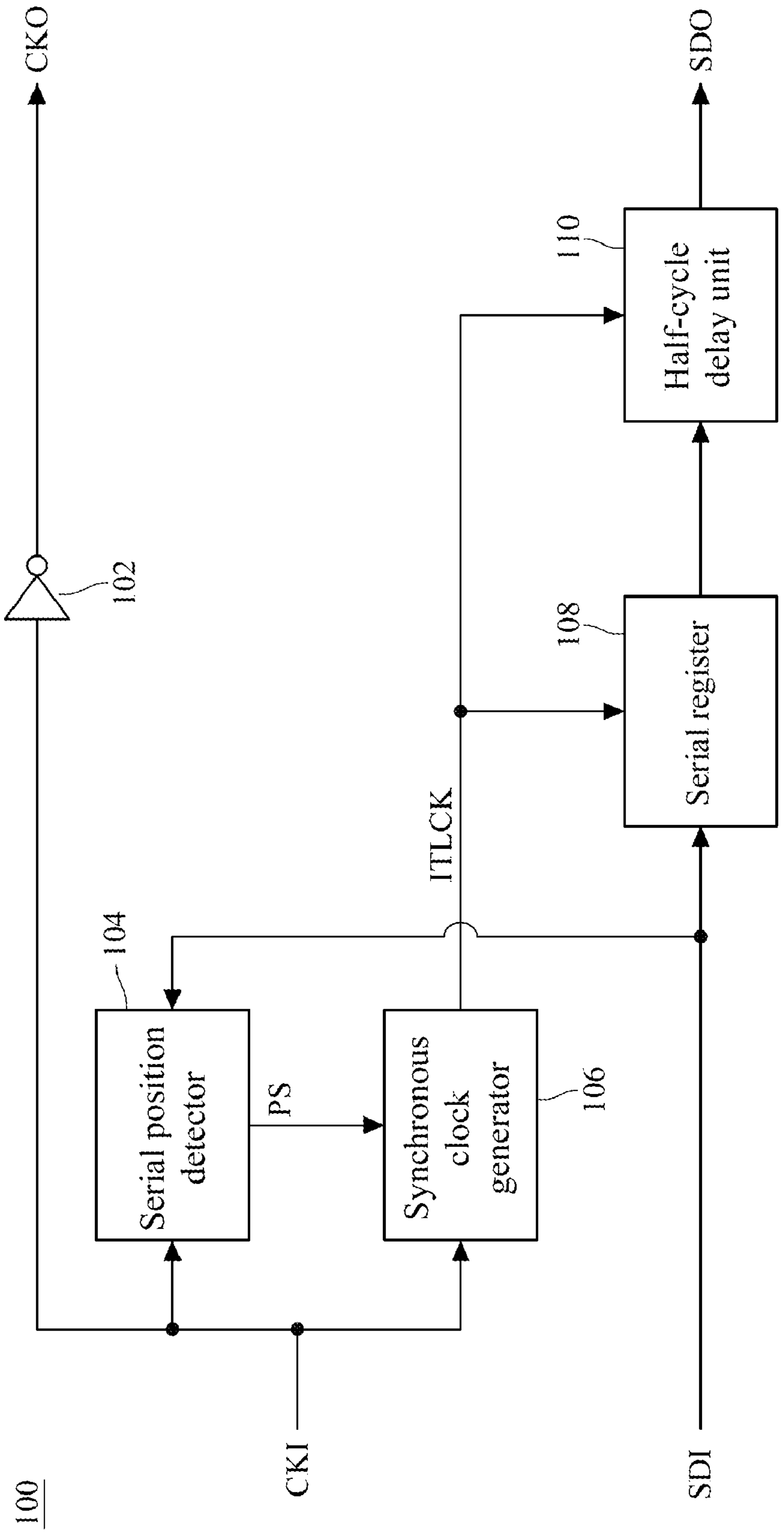
FIG. 2 is a schematic block view illustrating functions of a serial controller according to the first embodiment of the present invention.

FIG. 2 is a schematic block view illustrating functions of the serial controller according to the first embodiment of the present invention. The serial controller 100 is adapted to receive an external clock CKI and an input data SDI and output an inverted clock CKO and an output data SDO. Taking the serial controller 100 at the $0^{th}$ stage of the serial cluster 1000 as shown in FIG. 1A as an example, the external clock CKI and the inverted clock CKO in FIG. 2 are respectively corresponding to the clock signals CKI0 and CKI1 in FIG. 1A. The input data SDI and the output data SDO in FIG. 2 are respectively corresponding to the data signals SDI0 and SDI1 in FIG. 1A. Hereinafter, the serial controller 100 at the $0^{th}$ stage of the serial cluster 1000 is taken as an example for illustration, but the present invention is not limited thereto. That is to say, the serial controller 100 at any stage of the serial cluster 1000 falls within the protection scope of the present invention, and only the serial controller 100 at the $0^{th}$ stage is taken as one example for illustration of the embodiment.

The serial controller 100 comprises an inverter 102, a serial position detector 104, a synchronous clock generator 106, a serial register 108, and a half-cycle delay unit 110.

Figure 3B:
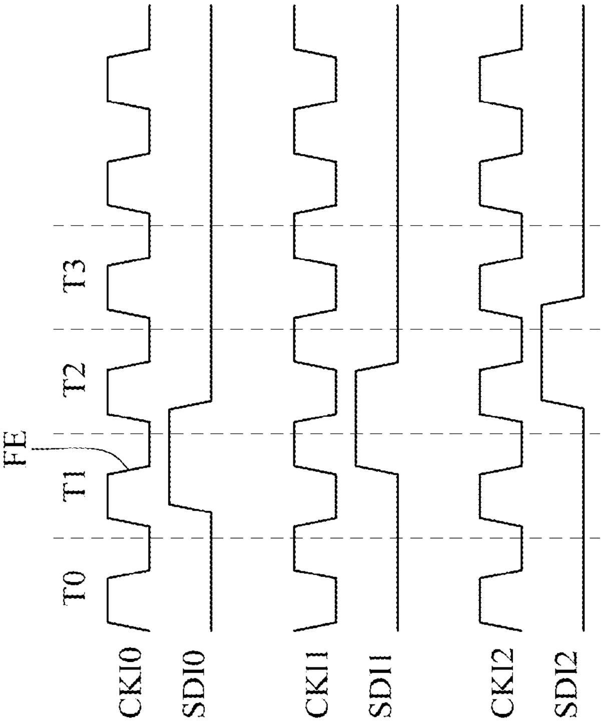
FIG. 3B is a schematic waveform diagram of input data of FIG. 3A advanced by a half cycle.
Figure 3A:
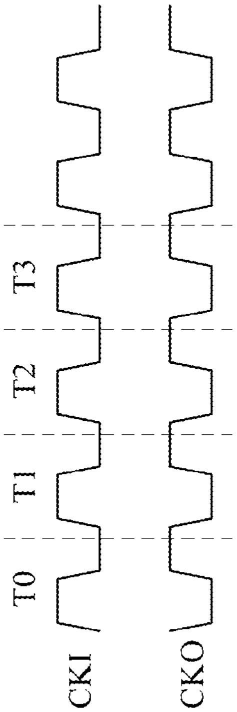
FIG. 3A is a schematic waveform diagram of an external clock and an inverted clock according to the first embodiment of the present invention.

The inverter 102 receives the external clock CKI and outputs the inverted clock CKO, as shown in FIG. 3A, and the phase of the inverted clock CKO is opposite to the phase of the external clock CKI at any duty cycle T0, T1, T2, T3.

Since the external clock CKI is inverted into the inverted clock CKO between any two neighboring stages of the serial cluster 1000, if the phenomenon of uneven duty cycle of the external clock CKI occurs in the transmission process, the phenomenon can be balanced by the serial controller 100 at the next stage. In this case, according to the embodiment of the present invention, the problem of waveform distortion of the external clock CKI caused by the multilevel accumulative effect is solved.

Figure 4A:
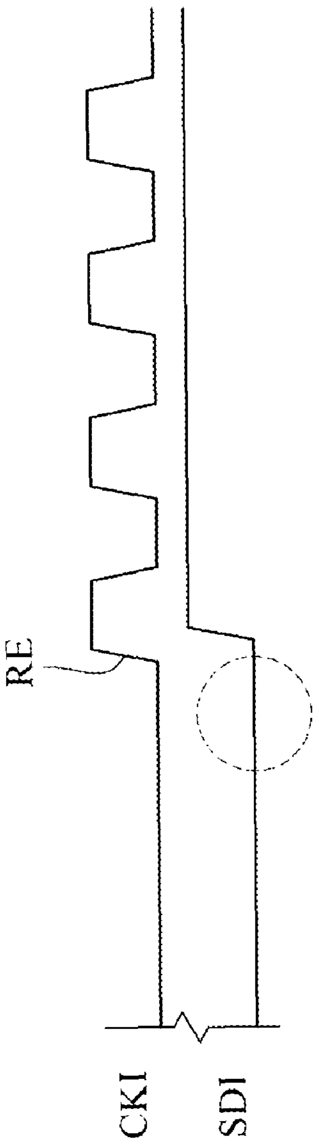
FIGS. 4A and 4B are schematic waveform diagrams of deciding a position signal according to the first embodiment of the present invention.
Figure 4B:
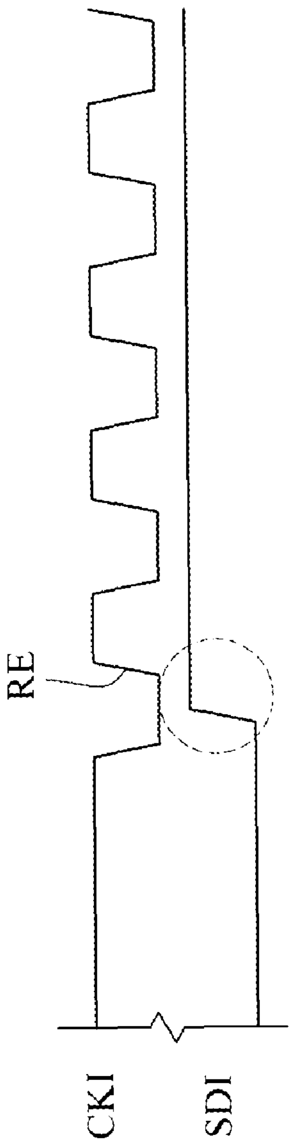

The serial position detector 104 receives the external clock CKI and the input data SDI and outputs a position signal PS, wherein the position signal PS is an odd signal or an even signal. As shown in FIG. 4A, when the external clock CKI is at a first rising edge RE, and the serial position detector 104 detects that the input data SDI is at the low level, the serial position detector 104 outputs the even signal as the position signal PS. Otherwise, as shown in FIG. 4B, when the external clock CKI is at the first rising edge RE, and the serial position detector 104 detects that the input data SDI is at the high level, the serial position detector 104 outputs the odd signal as the position signal PS. According to the serial controller 100 of the first embodiment of the present invention, the odd signal and the even signal respectively indicate at which stage the serial controller 100 is located within the serial cluster 1000, either at even transmission stage point (the $0^{th}$ stage, $2^{nd}$ stage, . . . ) or at odd transmission stage point (the $1^{st}$ stage, $3^{rd}$ stage, . . . ).

Figure 5A:
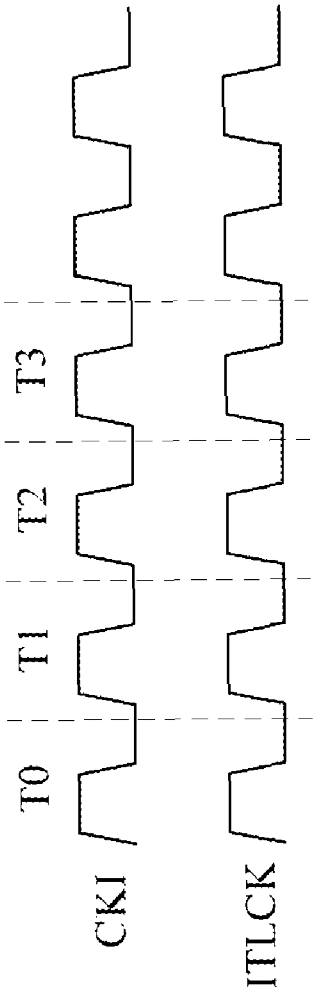
FIGS. 5A and 5B are schematic waveform diagrams of a synchronous clock according to the first embodiment of the present invention.
Figure 5B:
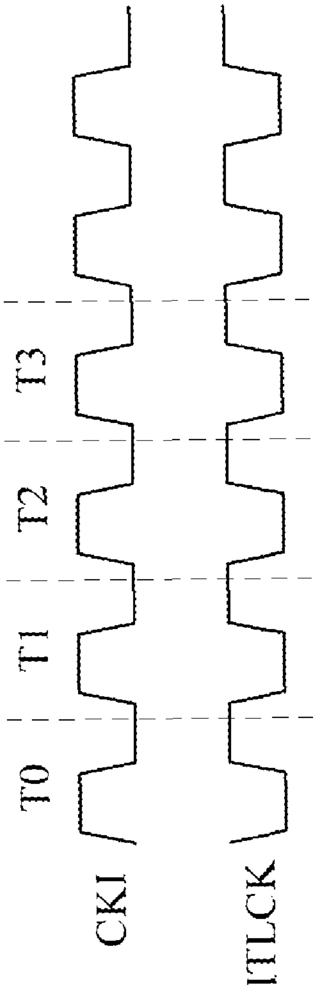

The synchronous clock generator 106 outputs a synchronous clock ITLCK according to the position signal PS and the external clock CKI. For example, when the position signal PS output by the serial position detector 104 is the odd signal, as shown in FIG. 5A, the synchronous clock ITLCK and the external clock CKI are in the same phase, and when the position signal PS is the even signal, as shown in FIG. 5B, the synchronous clock ITLCK and the external clock CKI are in the opposite phase.

Figure 6:
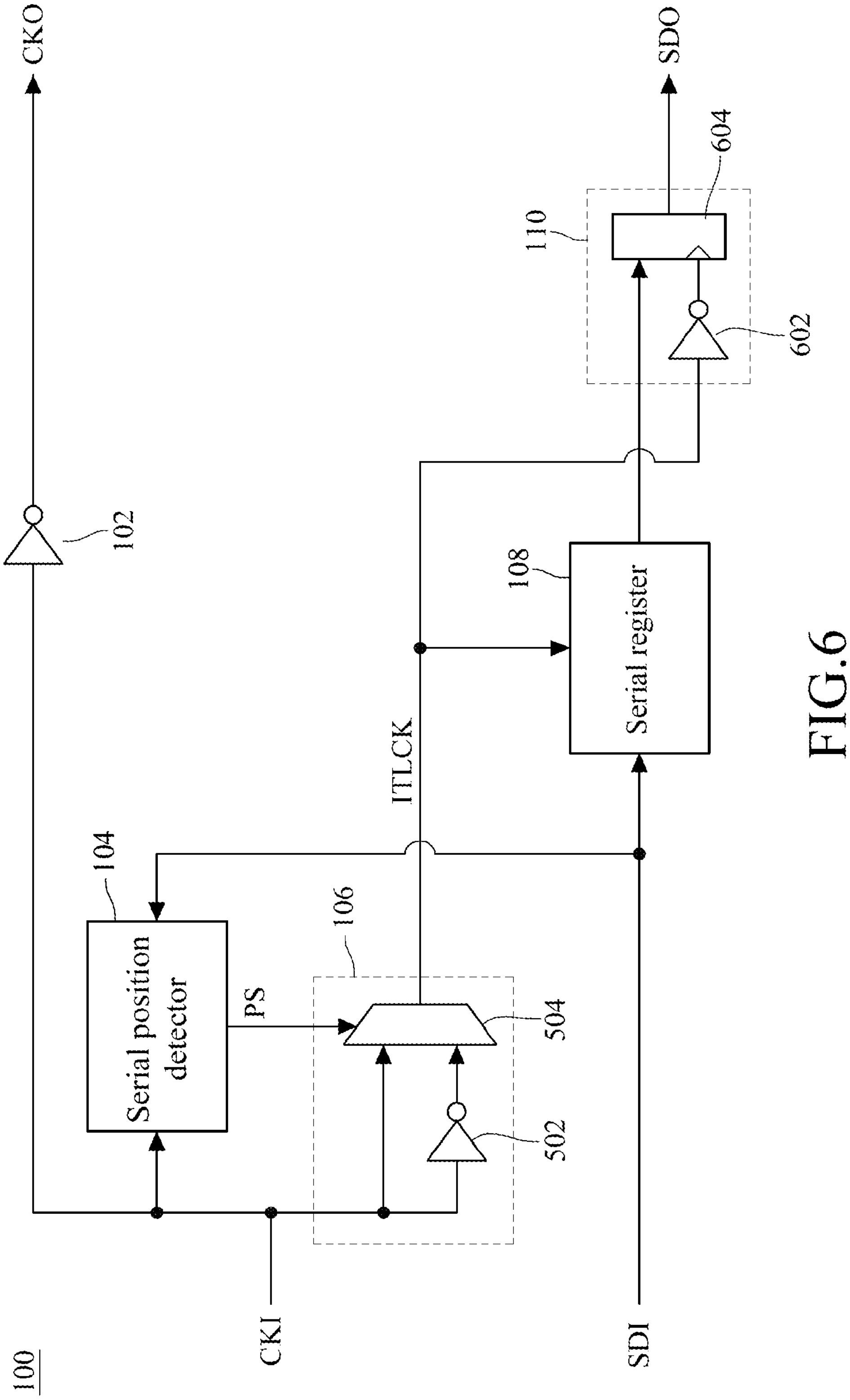
FIG. 6 is a schematic view illustrating details of the circuit of the serial controller according to the first embodiment of the present invention.

FIG. 6 is a schematic view illustrating details of the circuit of the serial controller 100 according to the first embodiment of the present invention. The synchronous clock generator 106 may comprise a first inverter unit 502 and a selector 504, wherein the first inverter unit 502 receives and inverts the external clock CKI and then outputs an inverted clock of the external clock CKI to the selector 504. Two input ends of the selector 504 are respectively connected to the first inverter unit 502 and the external clock CKI, that is, the selector 504 selectively outputs the external clock CKI or the inverted clock of the external clock CKI from the first inverter unit 502. As described in the above embodiment, when the position signal PS is the odd signal, the selector 504 outputs the external clock CKI as the synchronous clock ITLCK, and when the position signal PS is the even signal, the selector takes the output of the first inverter unit 502 (i.e., the inverted clock of the external clock CKI) as the synchronous clock ITLCK. Thus, no matter where the serial controller 100 is (either at the odd transmission stage point or the even transmission stage point of the serial cluster 1000), the synchronous clock generator 106 may still generate a synchronous clock ITLCK that is not limited to the position of the transmission stage point, and thus the synchronous clock ITLCK has 180 degrees of phase difference from the clock received by the serial controller 100 at the $0^{th}$ stage (or the even transmission stage point). Thereby, sufficient setup time and hold time are ensured in the data transmission process.

The serial register 108 receives and temporarily stores the input data SDI according to the synchronous clock ITLCK, and outputs the input data SDI to the half-cycle delay unit 110, so as to complete the data transmission among all stages in the series. Besides, as shown in FIGS. 1A and 1B, when the serial controller 100 is used as a driving circuit for driving the LEDs 10 or stage light controllers (DMX 512), the serial register 108 may also buffer the input data SDI stored therein (i.e., to buffer the input data SDI in the serial register 108 to a buffer register) and output the data as the PWM signal, i.e., to convert the data in the buffer register into the PWM signal for driving the LEDs 10 or the light/dark signals, motor driving signals, and the like for driving other electronic components, e.g., driving the stage lights to execute preset functions.

Since the phase of the inverted clock CKO is opposite to that of the external clock CKI (i.e., the phase of the input clock of the serial controller 100 at each stage is opposite to that of the input clock of the serial controller 100 at the previous stage), the output data SDO of the serial controller 100 at each stage may arrive the serial controller 100 at the next stage a half cycle earlier.

As shown in FIG. 3B, the input data SDI1 is triggered when the clock signal CKI1 is at a falling edge FE of the duty cycle T1, and arrives the serial controller 100 at the $1^{st}$ stage a half cycle earlier. Accordingly, if there are numbers of n serial controllers 100 connected in series in the serial cluster 1000, the output data SDO of the serial controller 100 at the $n^{th}$ stage arrives the serial controller 100 at its next stage n/2 cycle earlier. To solve this problem, according to the first embodiment of the present invention, the half-cycle delay unit 110 receives the input data SDI from the serial register 108, delays the input data SDI by a half cycle of the synchronous clock ITLCK, and then outputs the data as the output data SDO.

As shown in FIG. 6, according to the first embodiment of the present invention, the half-cycle delay unit 110 comprises a second inverter unit 602 and a register 604. The second inverter unit 602 receives and inverts the synchronous clock ITLCK, and then outputs an inverted clock of the synchronous clock ITLCK to the register 604. One end of the register 604 receives the input data SDI, and therefore outputs the output data SDO when the inverted clock of the synchronous clock ITLCK is triggered. Thus, the half-cycle delay unit 110 delays the signal output by the serial register 108 (i.e., the signal received by the half-cycle delay unit 110) by a half cycle of the synchronous clock ITLCK (i.e., the FE is delayed by a half cycle), and in this manner, the output data SDO output by the register 604 and the inverted clock CKO are synchronous, so as to achieve the purpose that the output data SDO of the serial controllers 100 at all stages of the serial cluster 1000 are synchronous with the input data SDI.

Figure 3C:
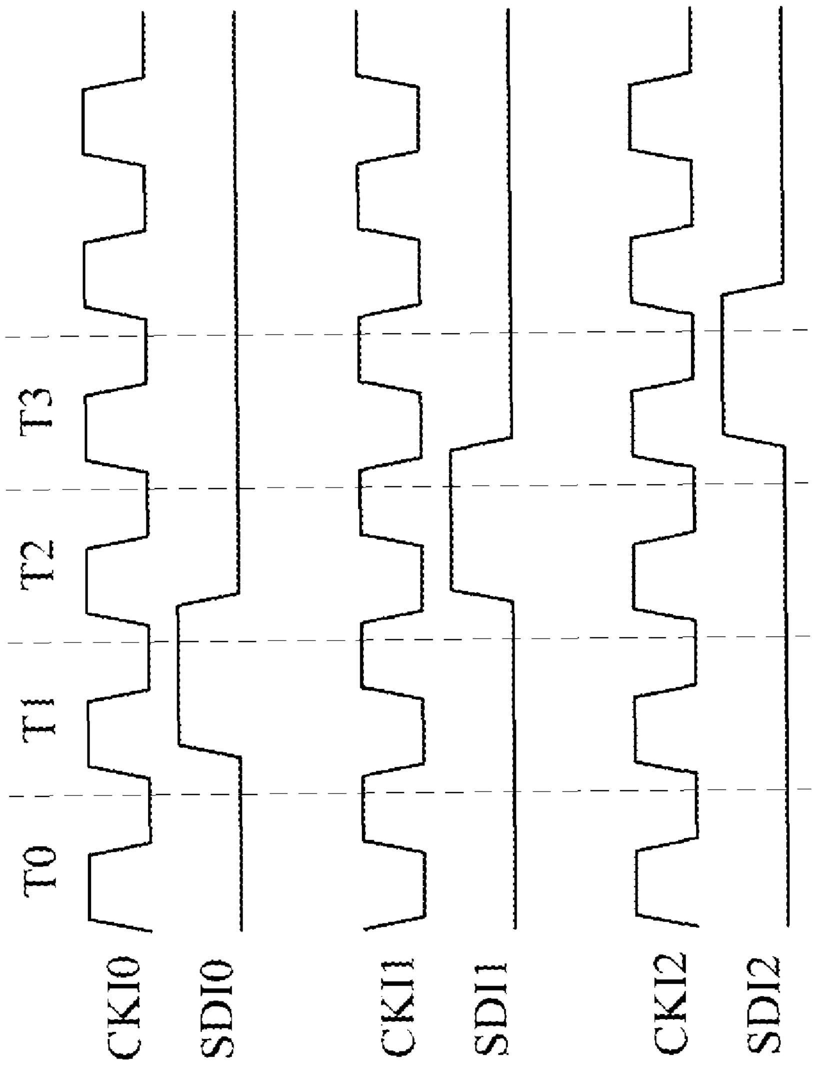
FIG. 3C is a schematic waveform diagram of the input data and output data of the serial cluster according to the first embodiment of the present invention.

Referring to FIGS. 1A, 1B, and 3C together, when the input data SDI0 of the serial controller 100 at the $0^{th}$ stage of the serial cluster 1000 is transmitted to the serial controller 100 at the $1^{st}$ stage in the duty cycle T1, the serial controller 100 at the $1^{st}$ stage may receive its input data SDI1 in the duty cycle T2, thus achieving the purpose of synchronous transmission of the serial controllers 100 at all stages.

Figure 7A:
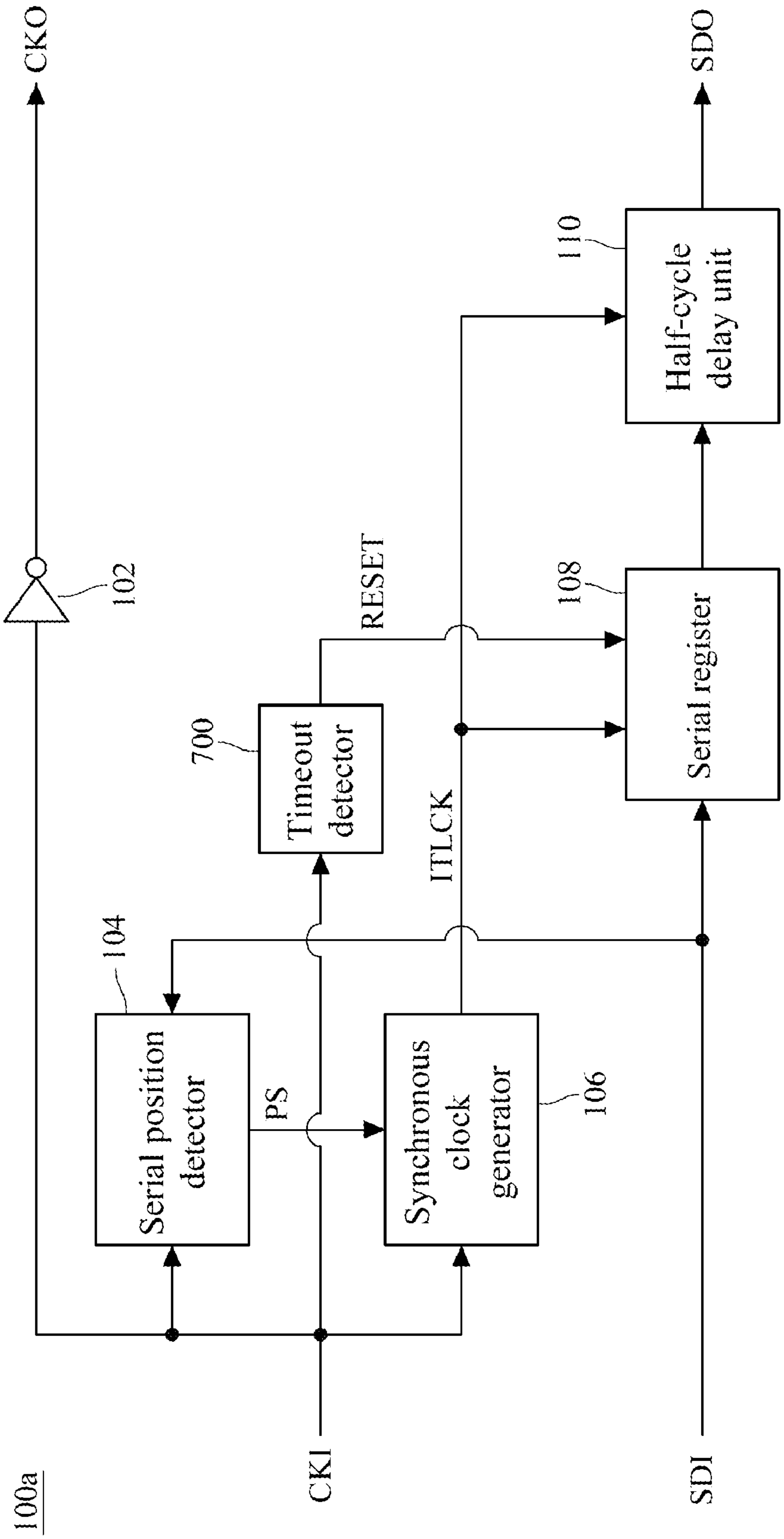
FIG. 7A is a schematic block view illustrating functions of a serial controller according to a second embodiment of the present invention.

Next, in the serial cluster 1000, since serial transmission is implemented among the serial controllers 100 connected at all stages, and the data signals (the input data SDI and the output data SDO) are delivered one stage to another, the serial controller 100 at each stage needs to identify whether the current data signal is fed to the serial controller 100 at this stage through a decoding mechanism therein. When the serial cluster 1000 is interfered by noises in long-distance transmission or encounters circumstances like hot-plug, errors may occur to the decoding mechanism of the serial controller 100 and cause chaos. To solve this problem, according to a second embodiment of the present invention, as shown in FIG. 7A, the serial controller 100*a* may further comprise a timeout detector 700 for receiving the external clock CKI, and outputting a reset signal RESET to the serial register 108 when the external clock CKI satisfies such a certain condition that the serial controller 100*a* can be triggered by the reset signal RESET and resume its decoding mechanism even if the hot-plug or noise interference occurs.

Figure 8A:
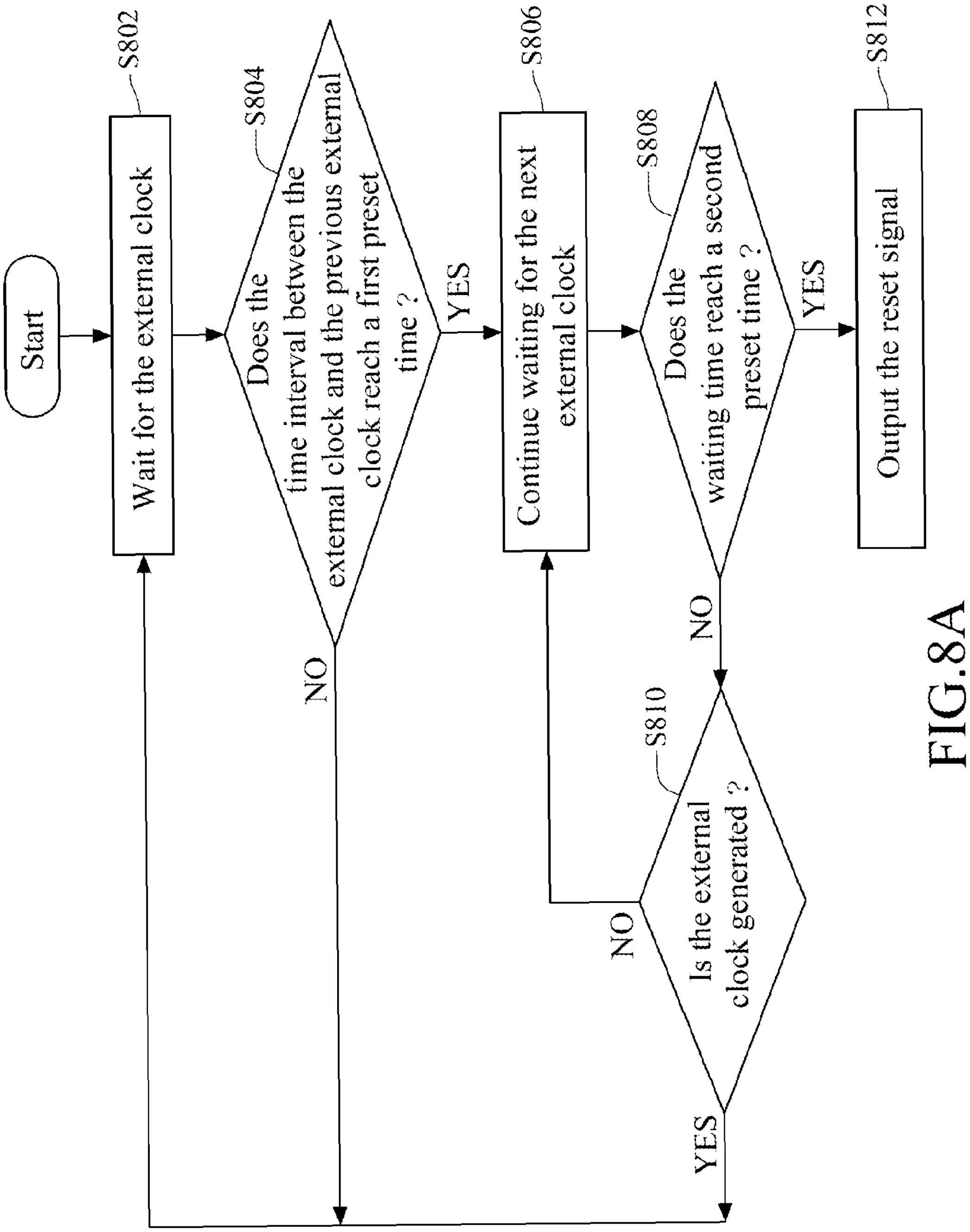
FIGS. 8A to 8C are schematic views of a state machine of a timeout detector according to the second and third embodiments of the present invention.

FIG. 8A is a schematic view of a state machine of the timeout detector 700 according to the second embodiment of the present invention. The timeout detector 700 carries out Steps S802, S804, S806, S808, S810, and S812. The timeout detector 700 first performs Step S802 and waits for the external clock CKI, and when the external clock CKI is generated, in Step S804, the timeout detector 700 determines whether the time interval between the generated external clock CKI and the previous external clock CKI reaches a first preset time. If yes, in Step S806, the timeout detector 700 continues waiting for the next external clock CKI; otherwise, returns to Step S802 to restart the state machine.

The timeout detector 700 continues waiting for the next external clock CKI in Step S806, and determines whether the waiting time has reached a second preset time in Step S808. If yes, the timeout detector 700 performs Step S812 to output the reset signal RESET; otherwise, the timeout detector 700 enters Step S810 to determine whether the external clock CKI is generated. If the external clock CKI has already been generated, the timeout detector 700 returns to Step S802 to restart the state machine. If the external clock CKI has not been generated yet, the timeout detector 700 returns to Step S806 to keep waiting.

Figure 8B:
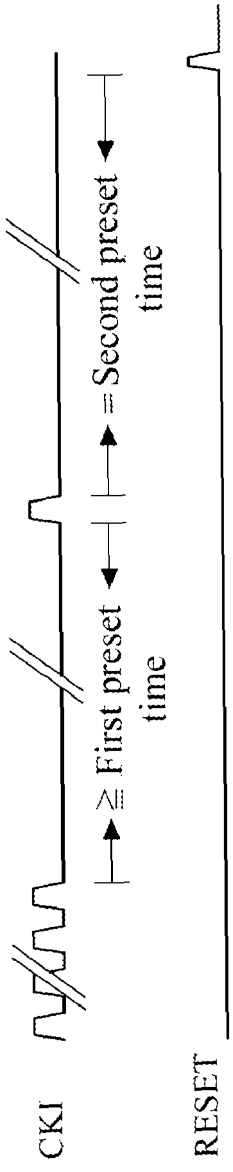
Figure 8C:
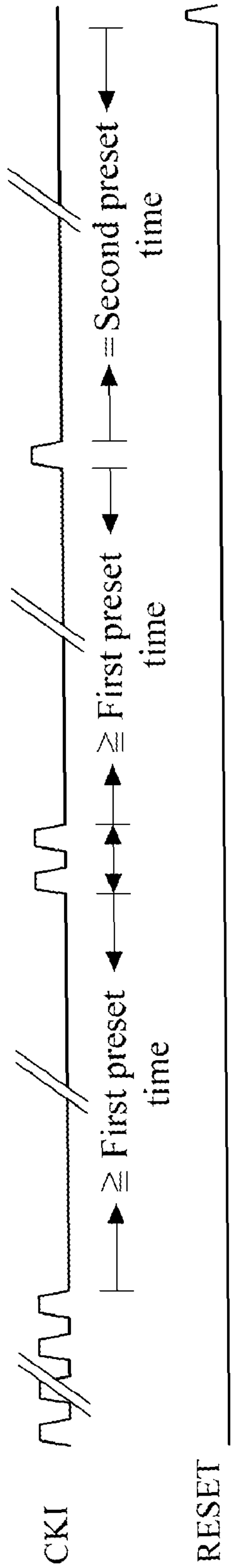

For example, referring to FIGS. 8B and 8C together, FIG. 8B is a relative sequence waveform diagram illustrating the state machine of the timeout detector 700 follows Steps S802, S804, S806, S808, to S812 to output the reset signal RESET, and FIG. 8C illustrates the state machine of the timeout detector 700 follows Steps S802, S804, S806, S808, S810 and returns to Step S802 to restart its state machine (the time interval between two continuous external clocks does not reach the second preset time, and thus the timeout detector 700 follows Steps S808 to S810 and returns to Step S802). The first preset time and the second preset time may be respectively preset by the user, e.g., the first preset time may be 100 clock cycles, and the second preset time may be 50 clock cycles and the like.

Figure 7B:
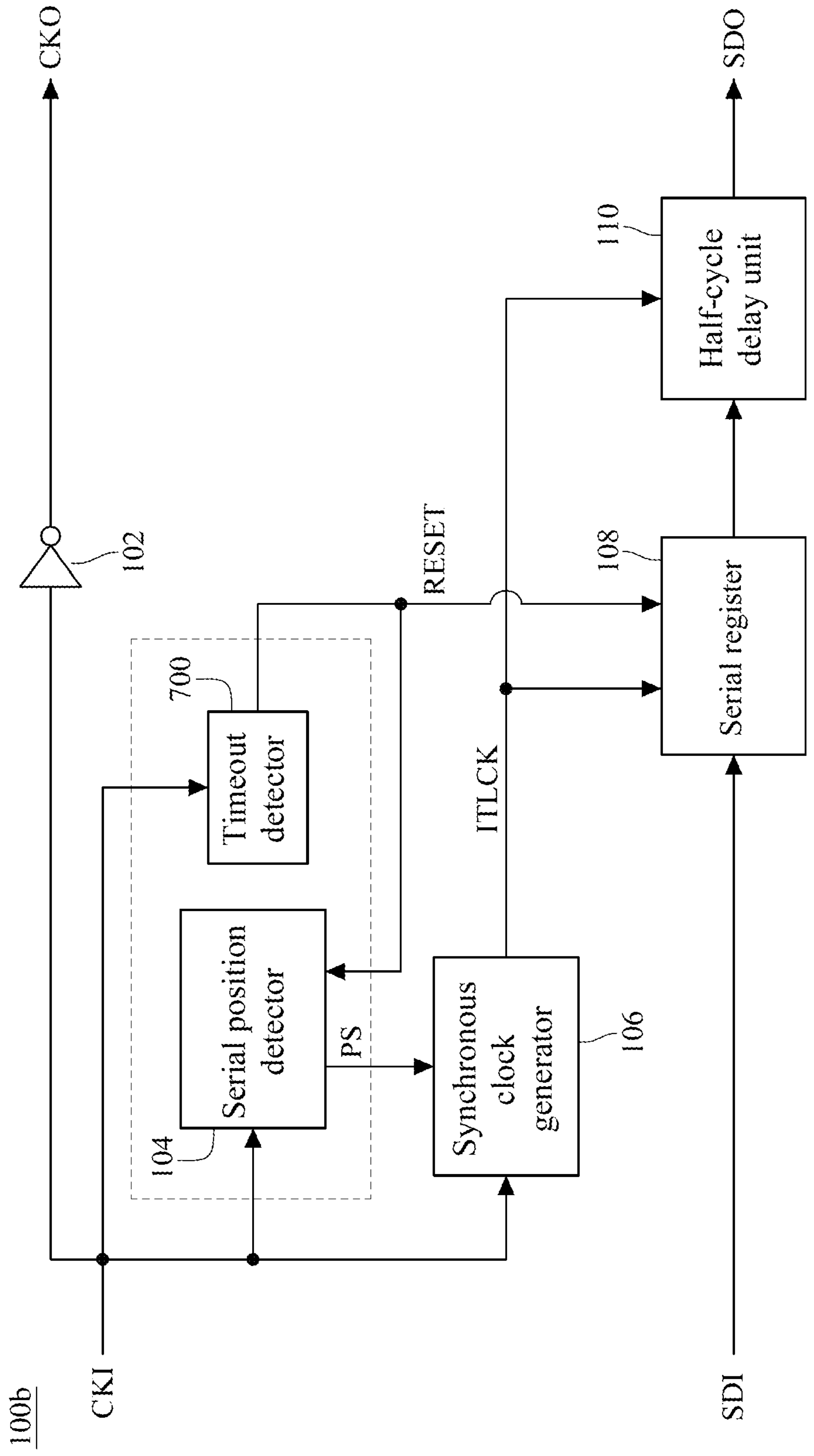
FIG. 7B is a schematic block view illustrating functions of a serial controller according to a third embodiment of the present invention.

FIG. 7B is a schematic block view illustrating functions of a serial controller 100*b* according to a third embodiment of the present invention. The timeout detector 700 and the serial position detector 104 are integrated as a single circuit block to reduce the extra fabricating cost of the circuit and reduce the using area of some chips. Herein, the serial position detector 104 may determine the position of the serial controller 100 in the serial cluster 1000 through detection of the reset signal RESET and the external clock CKI.

Figure 9A:
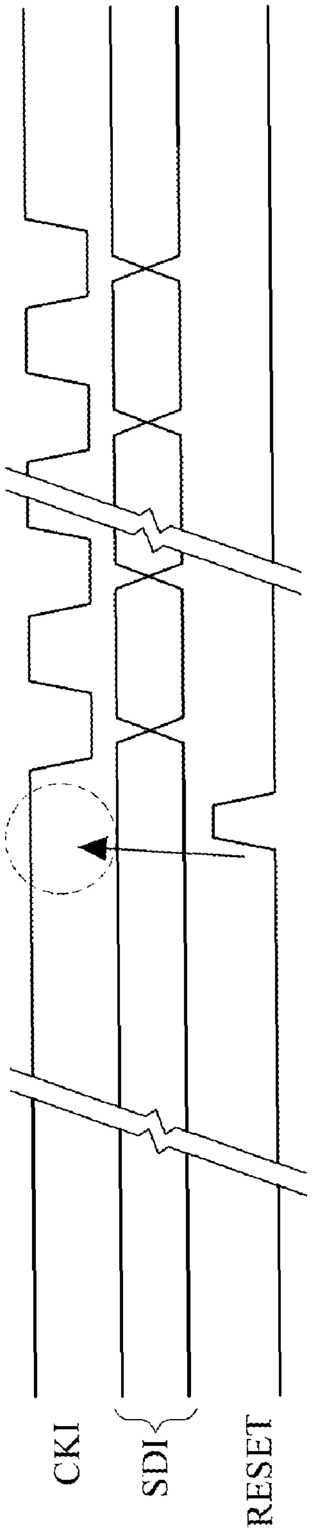
FIGS. 9A and 9B are schematic waveform diagrams of deciding a position signal according to the third embodiment of the present invention.
Figure 9B:
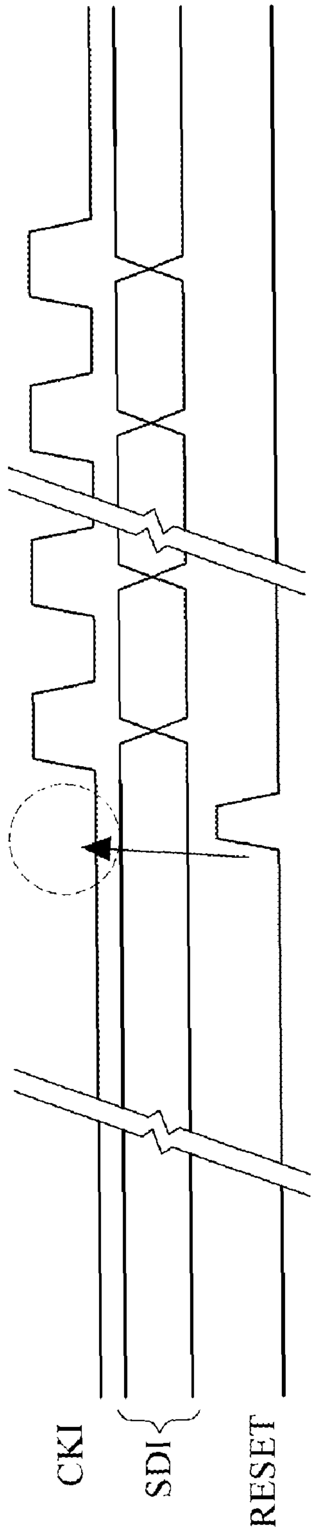

For example, referring to FIG. 9A, when the timeout detector 700 generates the reset signal RESET and the serial position detector 104 detects that the external clock CKI is at the high level, the serial position detector 104 outputs the odd signal as the position signal PS. Otherwise, as shown in FIG. 9B, when the timeout detector 700 generates the reset signal RESET and the serial position detector 104 detects that the external clock CKI is at the low level, the serial position detector 104 outputs the even signal as the position signal PS.

Thus, in the serial controller 100*b* of the third embodiment of the present invention, the timeout detector 700 is integrated together within the serial position detector 104 to achieve purpose of a single circuit block, and furthermore a method for determining the position of the serial controller 100 in the serial cluster 1000 according to the reset signal RESET is provided.

Figure 10A:
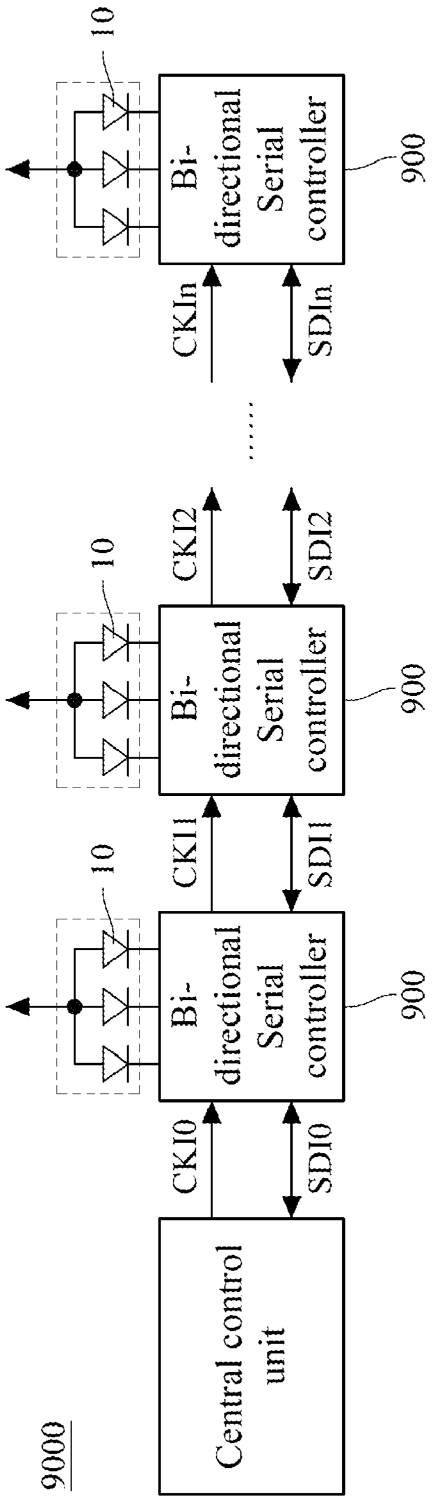
FIGS. 10A and 10B are schematic architectural views illustrating an application of a bi-directional serial cluster according to a fourth embodiment of the present invention.
Figure 10B:
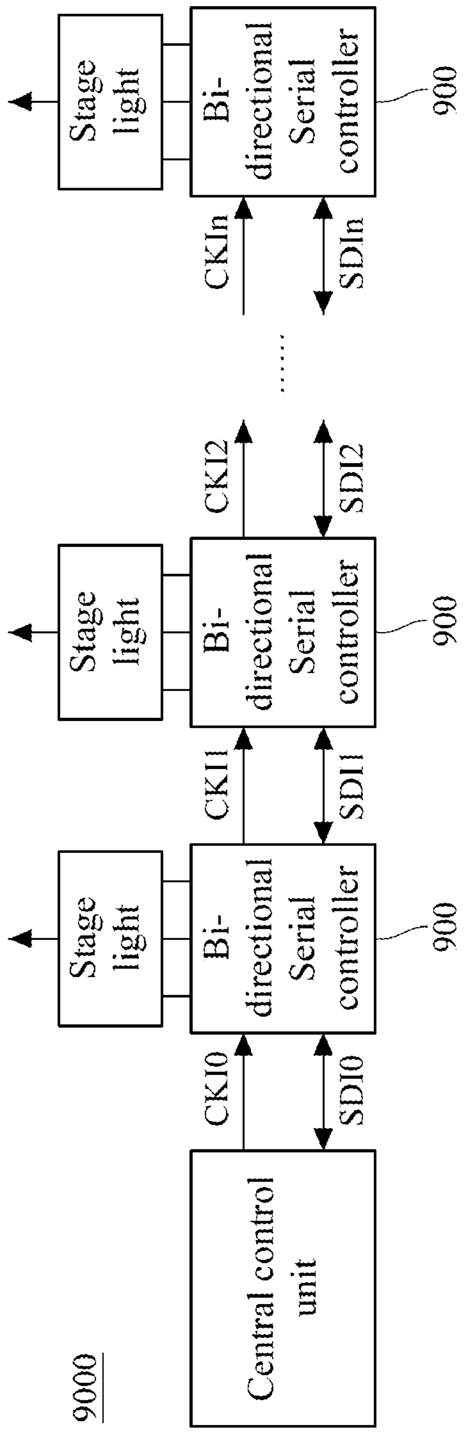

In order to achieve the purpose of bi-directional transmission of data between two neighboring serial controller 100, FIGS. 10A and 10B are schematic architectural views illustrating an application of a bi-directional serial cluster according to a fourth embodiment of the present invention. A bi-directional serial controller 900 is applied in the bi-directional serial cluster 9000, in which the bi-directional serial cluster 9000 comprises a plurality of bi-directional serial controllers 900. The bi-directional serial controller 900 of the fourth embodiment of the present invention can be used for driving LEDs 10 as shown in FIG. 10A or driving stage light controllers (for example, but not limited to, functions similar to DMX 512 controllers) as shown in FIG. 10B, and its application field is not limited thereto. For example, the bi-directional serial cluster 9000 can not only be used for serially connecting and bi-directionally transmitting data signals SDI0, SDI1, SDI2, . . . , SDIn between the bi-directional serial controllers 900 at all stages, but also converting the data signals SDI0, SDI1, SDI2, . . . , SDIn transmitted to the bi-directional serial controllers 900 at all stages into PWM signals, or light/dark signals, motor driving signals, and the like for driving the LEDs 10 or the stage lights.

Figure 11:
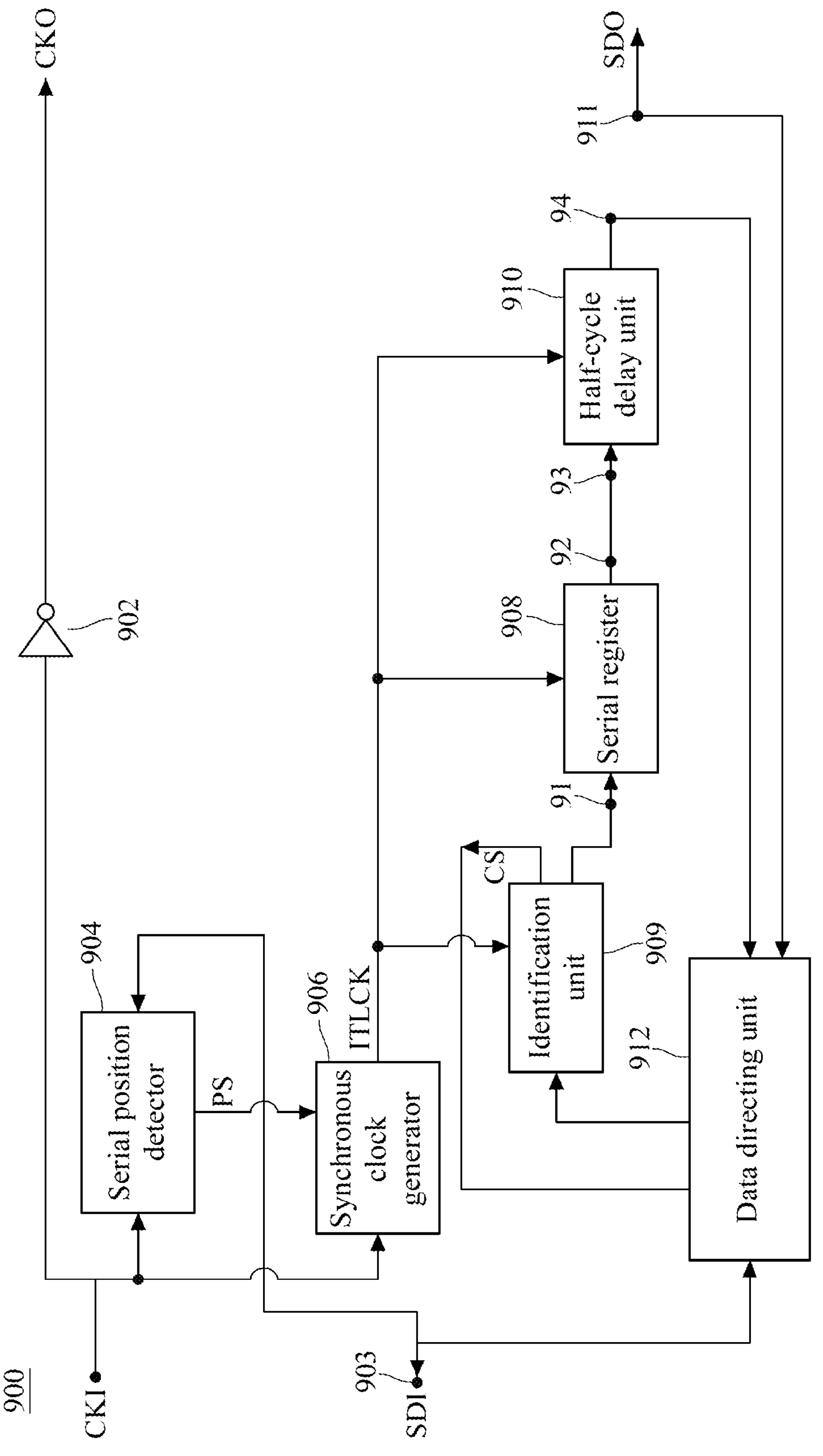
FIG. 11 is a schematic block view illustrating functions of the bi-directional serial controller according to the fourth embodiment of the present invention.

FIG. 11 is a schematic block view illustrating functions of the bi-directional serial controller 900 according to the fourth embodiment of the present invention. The bi-directional serial controller 900 comprises an inverter 902, an input contact 903, a serial position detector 904, a synchronous clock generator 906, a serial register 908, an identification unit 909, a half-cycle delay unit 910, an output contact 911, and a data directing unit 912.

Figure 12:
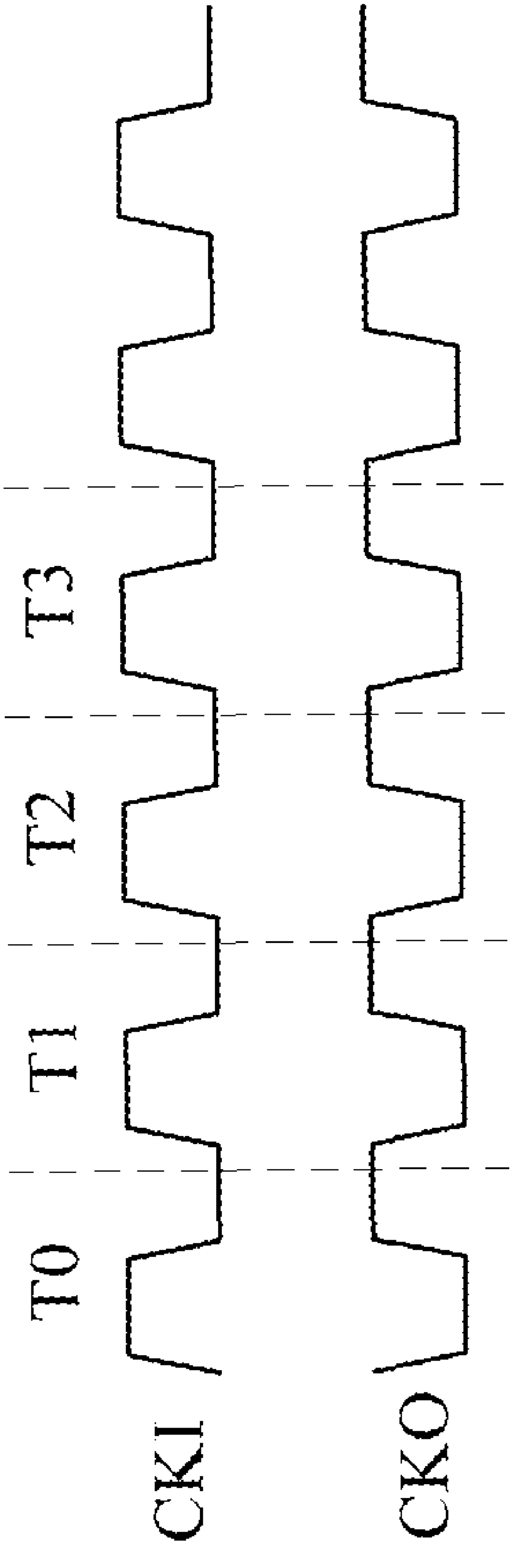
FIG. 12 is a schematic waveform diagram of an external clock and an inverted clock according to the fourth embodiment of the present invention.

The inverter 902 receives an external clock CKI and outputs an inverted clock CKO, as shown in FIG. 12, and the phase of the inverted clock CKO is opposite to the phase of the external clock CKI at any duty cycle T0, T1, T2, T3.

The input contact 903 receives an input data SDI. The serial position detector 904 receives the external clock CKI and the input data SDI and outputs a position signal PS, wherein the position signal PS is an odd signal or an even signal. The method for determining whether the position signal PS output by the serial position detector 904 is the odd signal or the even signal is the same as that of the first and second embodiments, i.e. being decided by determining if the input data SDI is at the high or low level when the external clock CKI is at the first rising edge RE. Besides, the method for determining whether the position of the bi-directional serial controller 900 is located at an odd or even transmission stage point of the bi-directional serial cluster 9000 may also be decided by a reset signal RESET of the bi-directional serial controller 900 (as set forth in the third embodiment).

The synchronous clock generator 906 outputs a synchronous clock ITLCK according to the position signal PS and the external clock CKI. For example, when the position signal PS output by the serial position detector 904 is the odd signal, the synchronous clock ITLCK and the external clock CKI are in the same phase, and when the position signal PS is the even signal, the synchronous clock ITLCK and the external clock CKI are in the opposite phase.

Figure 13:
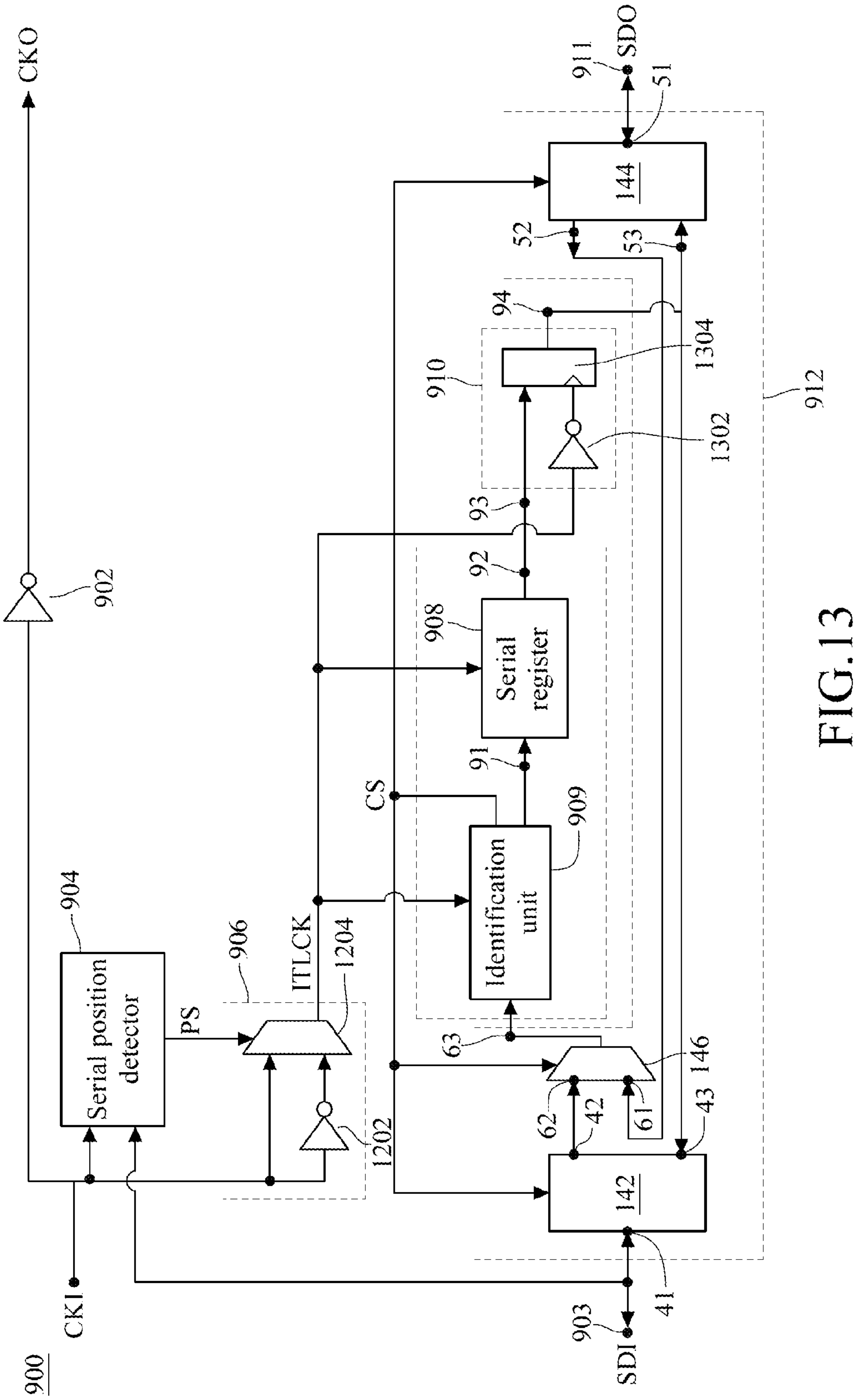
FIG. 13 is a schematic view illustrating details of the circuit of the bi-directional serial controller according to the fourth embodiment of the present invention.

FIG. 13 is a schematic view illustrating details of the circuit of the bi-directional serial controller 900 according to the fourth embodiment of the present invention. The synchronous clock generator 906 may comprise a first inverter unit 1202 and a selector 1204, in which the first inverter unit 1202 receives and inverts the external clock CKI and then outputs an inverted clock of the external clock CKI to the selector 1204. Two input ends of selector 1204 are respectively connected to the first inverter unit 1202 and the external clock CKI, that is, the selector 1204 selectively outputs the external clock CKI or the inverted clock of the external clock CKI from the first inverter unit 1202. As described in the above embodiment, when the position signal PS is the odd signal, the selector 1204 outputs the external clock CKI as the synchronous clock ITLCK, and when the position signal PS is the even signal, the selector takes the output of the first inverter unit 1202 (i.e., the inverted clock of the external clock CKI) as the synchronous clock ITLCK. Thus, no matter where the bi-directional serial controller 900 is (either at the odd transmission stage point or the even transmission stage point of the bi-directional serial cluster 9000), the synchronous clock generator 906 may still generate a synchronous clock ITLCK that is not limited to the position of the transmission stage point, and thus the synchronous clock ITLCK has 180 degrees of phase difference from the clock received by the bi-directional serial controller 900 at the $0^{th}$ stage (or the even transmission stage point). Thereby, sufficient setup time and hold time are ensured in the data transmission process.

The serial register 908 has a receiving end 91 and a transmitting end 92, and the serial register 908 temporarily stores signals received by the receiving end 91 according to the synchronous clock ITLCK and outputs the signals from the transmitting end 92. Then, as described in the above embodiment, as shown in FIGS. 10A and 10B, when the bi-directional serial controller 900 is used as a driving circuit for driving the LEDs 10 or stage light controllers (DMX 512), the serial register 908 may also buffer the input data SDI stored therein (i.e., to buffer the input data SDI in the serial register 908 to a buffer register) and output the data as the PWM signal, i.e., to convert the data in the buffer register into the PWM signal for driving the LEDs 10, or the light/dark signals, motor driving signals, and the like for driving other electronic components, e.g., driving the stage lights to execute preset functions.

The half-cycle delay unit 910 has an input point 93 and an output point 94, wherein the input point 93 is coupled to the transmitting end 92, and the half-cycle delay unit 910 delays the data from the input point 93 by a half cycle of the synchronous clock ITLCK and then outputs the data from the output point 94. As shown in FIG. 13, the half-cycle delay unit 910 may comprise a second inverter unit 1302 and a register 1304. The second inverter unit 1302 receives and inverts the synchronous clock ITLCK, and then outputs an inverted clock of the synchronous clock ITLCK to the register 1304. One end of the register 1304 is connected to the input point 93, and therefore outputs the signal from the input point 93 to the output point 94 when the inverted clock of the synchronous clock ITLCK is triggered. Thus, the half-cycle delay unit 910 delays the signal output by the transmitting end 92 (i.e., the signal received by the input point 93) by a half cycle of the synchronous clock ITLCK, and outputs the signal from the output point 94, so as to achieve the purpose that the signal output by the output point 94 is synchronous with the input data SDI.

The identification unit 909 receives output data of the data directing unit 912 (in an initial state, it is preset to write the data into the transmission point at the next stage, so the output data of the data directing unit 912 is the input data SDI) and the synchronous clock ITLCK, and accordingly outputs a control signal CS. The control signal CS comprises a return command, Readmode. For example, the input data SDI may contain an information tag, Header, and the identification unit 909 identifies whether the input data SDI is to be transmitted and written into the bi-directional serial controller 900 at the next stage or the state value of the bi-directional serial controller 900 at the current stage is read back by decoding the information tag, Header in the input data SDI. Herein, to reduce the using area of the chips, the designer, when designing the circuit, may selectively integrate the identification unit 909 and the serial register 908 as a single circuit block so as to reduce the extra fabricating cost of the circuit.

When receiving the return command, Readmode, the data directing unit 912 couples the output contact 911 to the receiving end 91 of the serial register 908 (i.e., delivers the signal of the output contact 911 to the receiving end 91), and couples the output point 94 of the half-cycle delay unit 910 to the input contact 903, so as to synchronously return the signal of the output contact 911 to the input contact 903.

When the data directing unit 912 does not receive the return command, Readmode, the data directing unit 912 couples the input contact 903 to the receiving end 91 of the serial register 908 and couples the output point 94 of the half-cycle delay unit 910 to the output contact 911, so as to synchronously write the input data SDI of the input contact 903 to the bi-directional serial controller 900 at the next stage of the bi-directional serial cluster 9000.

The data directing unit 912 may comprise an input changeover switch (input bi-directional buffer) 142, an output changeover switch (output bi-directional buffer) 144, and a selector 146. The input changeover switch 142 has a first end 41, a second end 42, and a third end 43, in which the first end 41 is coupled to the input contact 903. The output changeover switch 144 has a first pin 51, a second pin 52, and a third pin 53, in which the first pin 51 is coupled to the output contact 911, and the third pin 53 is coupled to the output point 94 and the third end 43. The selector 146 has a first input end 61, a second input end 62, and an output end 63, in which the first input end 61 is coupled to the second pin 52, the second input end 62 is coupled to the second end 42, and the output end 63 is coupled to the receiving end 91.

To state more clearly, when the data directing unit 912 receives the return command, Readmode, the input changeover switch 142 couples the first end 41 to the third end 43, the output changeover switch 144 couples the first pin 51 to the second pin 52, and the selector 146 couples the first input end 61 to the output end 63, so as to synchronously return the signal of the first pin 51 (i.e., the output contact 911) to the first end 41 (i.e., the input contact 903).

When the data directing unit 912 does not receive the return command, Readmode, the input changeover switch 142 couples the first end 41 to the second end 42, the output changeover switch 144 couples the first pin 51 to the third pin 53, and the selector 146 couples the second input end 62 to the output end 63, so as to synchronously write the signal of the first end 41 (i.e., the input contact 903) to the first pin 51 (i.e., the output contact 911), to serve as the input data SDI of the bi-directional serial controller 900 at the next stage of the bi-directional serial cluster 9000.

Figure 14A:
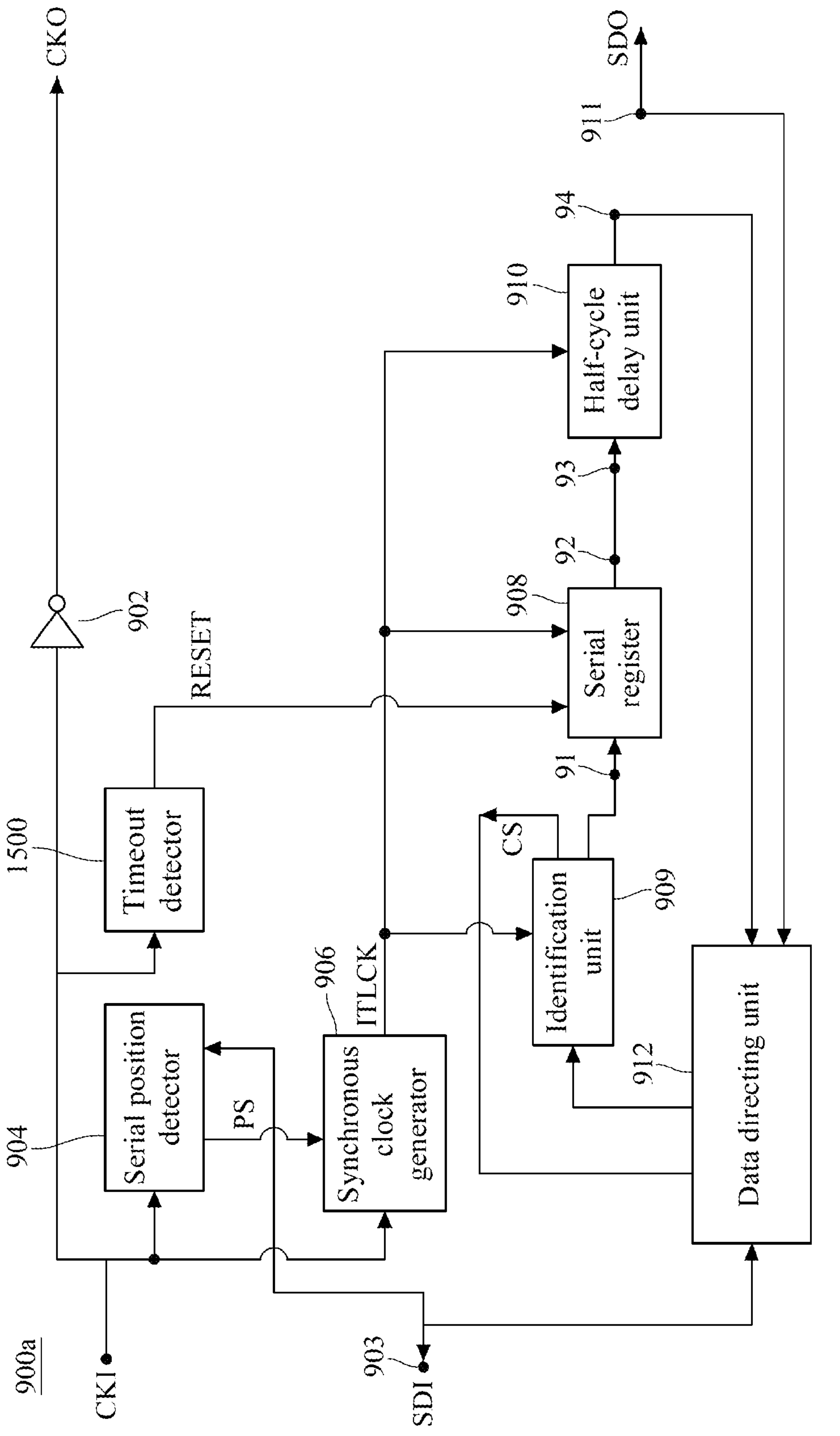
FIG. 14A is a schematic block view illustrating functions of a bi-directional serial controller according to a fifth embodiment of the present invention.

Moreover, when the bi-directional serial cluster 9000 is interfered by noises in long-distance transmission or encounters circumstances like hot-plug, errors may occur to the decoding mechanism of the bi-directional serial controller 900 and cause chaos. To solve this problem, according to a fifth embodiment of the present invention, as shown in FIG. 14A, the bi-directional serial controller 900*a* may further comprise a timeout detector 1500 for receiving the external clock CKI, and outputting a reset signal RESET to the serial register 908 when the external clock CKI satisfies such a certain condition that the bi-directional serial controller 900*a* can be triggered by the reset signal RESET and resume its decoding mechanism even if the hot-plug or noise interference occurs. The schematic views of the state machine of the timeout detector 1500 are the same as those of the timeout detector 700 in the second and third embodiments, and the details will not be repeated herein.

Figure 14B:
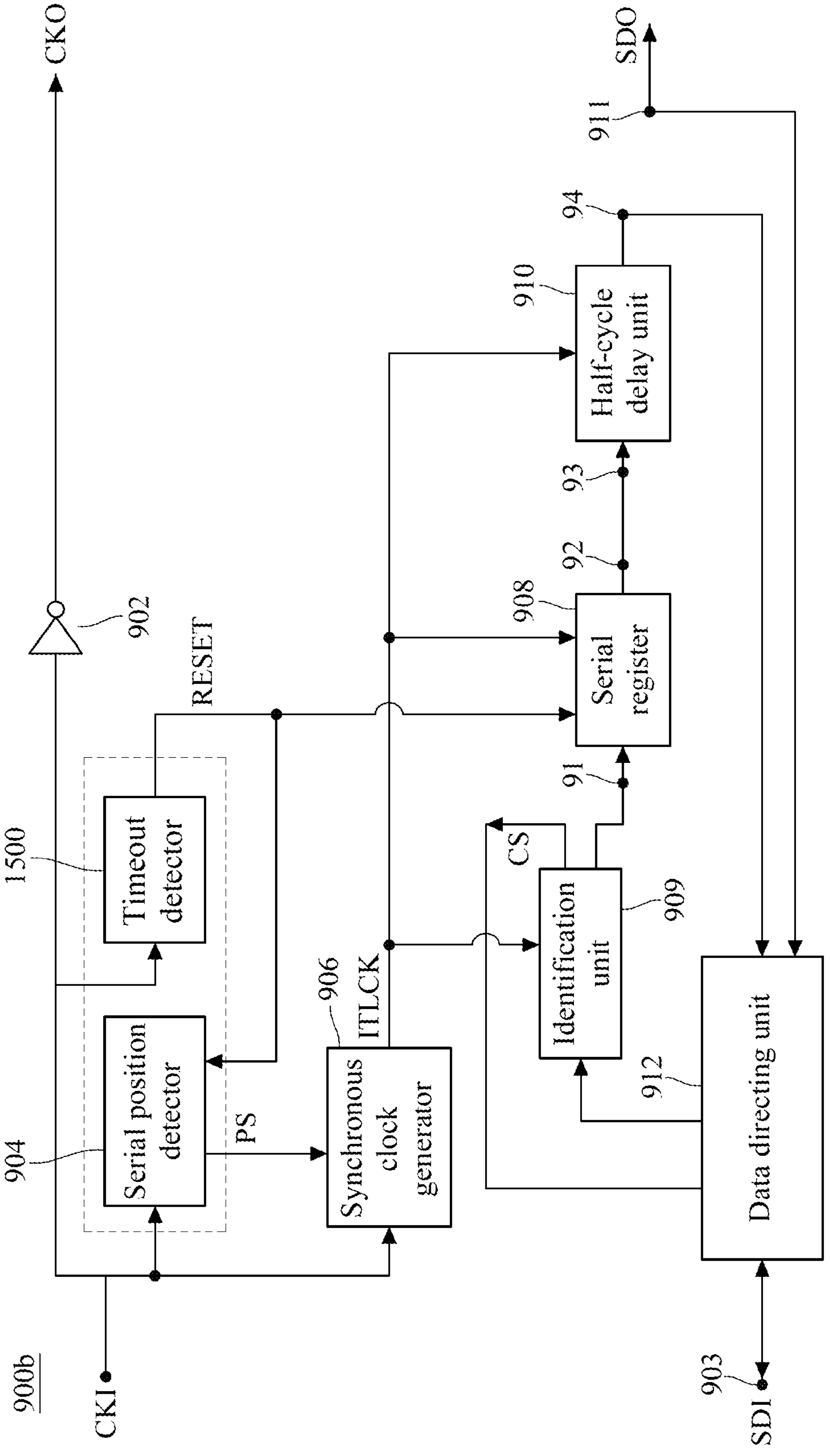
FIG. 14B is a schematic block view illustrating functions of a bi-directional serial controller according to a sixth embodiment of the present invention.

Next, the same as that of the third embodiment of the present invention (referring to FIG. 7B), in order to reduce the extra fabricating cost of the circuit and reduce the using area of the chips, referring to FIG. 14B, according to the bi-directional serial controller 900*b* of a sixth embodiment of the present invention, the timeout detector 1500 may be selectively integrated together within the serial position detector 904 to achieve a single circuit block. Thus, the serial position detector 904 may determine whether the position of the bi-directional serial controller 900 is located at the odd or even transmission stage point of the bi-directional serial cluster 9000 through detection of the reset signal RESET and the external clock CKI, and the determination method is the same as that of the third embodiment of the present invention, so the details will not be repeated herein.

Therefore, according to the first embodiment of the present invention, the serial controllers 100 at all stages are connected in series to form the serial cluster 1000, and the synchronous clock generator 106 may generate a synchronous clock ITLCK that is not associated with the transmission stage point of the serial controller 100. Further, the serial controller 100 may use the half-cycle delay unit 110 to achieve the purpose of synchronous transmission of the data signals of the serial controllers 100 at all stages in the long-distance series. In addition, according to the bi-directional serial controller 900 of the fourth embodiment of the present invention, the purpose of bi-directional transmission of the data signals between the bi-directional serial controllers 900 at all stages is further achieved, such that when the bi-directional serial controller 900 works abnormally, the error detection efficiency of the bi-directional serial cluster 9000 is improved.

What is claimed is:

1. A serial controller, adapted to receive an external clock and an input data and output an inverted clock and an output data, comprising:

- an inverter, for receiving the external clock and outputting the inverted clock;
- a serial position detector, for outputting a position signal according to the external clock and the input data, wherein the position signal is an odd signal or an even signal;
- a synchronous clock generator, for outputting a synchronous clock according to the position signal and the external clock, wherein when the position signal is the odd signal, the synchronous clock and the external clock are in the same phase, and when the position signal is the even signal, the synchronous clock and the external clock are in the opposite phase;
- a serial register, for receiving and temporarily storing the input data according to the synchronous clock and then outputting the data; and
- a half-cycle delay unit, for receiving the data from the serial register, delaying the data by a half cycle of the synchronous clock, and then outputting the data as the output data.

2. The serial controller according to claim 1, wherein when the external clock is at a first rising edge (RE) and the input data is at a high level, the serial position detector outputs the odd signal as the position signal, otherwise the serial position detector outputs the even signal as the position signal.

3. The serial controller according to claim 1, wherein when the position signal is the odd signal, the synchronous clock generator outputs the external clock as the synchronous clock, and when the position signal is the even signal, the synchronous clock generator inverts the external clock and outputs an inverted clock of the external clock as the synchronous clock.

4. The serial controller according to claim 3, wherein the synchronous clock generator comprises:

- a first inverter unit, for receiving and inverting the external clock, and then outputting the inverted clock of the external clock; and
- a selector, for outputting the external clock as the synchronous clock when the position signal is the odd signal, and taking the output of the first inverter unit as the synchronous clock when the position signal is the even signal.

5. The serial controller according to claim 1, wherein the half-cycle delay unit comprises:

- a second inverter unit, for inverting the synchronous clock; and
- a register, for receiving the input data according to an inverted clock of the synchronous clock from the second inverter and then outputting the data as the output data.

6. The serial controller according to claim 1, further comprising: a timeout detector, for outputting a reset signal to the serial register when the external clock satisfies a condition.

7. The serial controller according to claim 6, wherein when the timeout detector outputs the reset signal and the external clock is at a high level, the serial position detector outputs the odd signal as the position signal, otherwise the serial position detector outputs the even signal as the position signal.

8. A bi-directional serial controller, comprising:

- an inverter, for receiving and inverting an external clock, and then outputting an inverted clock;
- an input contact, for receiving an input data;
- a serial position detector, for outputting a position signal according to the external clock and the input data, wherein the position signal is an odd signal or an even signal;
- a synchronous clock generator, for outputting a synchronous clock according to the position signal and the external clock, wherein when the position signal is the odd signal, the synchronous clock and the external clock are in the same phase, and when the position signal is the even signal, the synchronous clock and the external clock are in the opposite phase;
- a serial register, having a receiving end and a transmitting end, and used for temporarily storing the signal received by the receiving end according to the synchronous clock and then outputting the signal from the transmitting end;
- an identification unit, for outputting a control signal according to the input data and the synchronous clock, wherein the control signal comprises a return command;
- a half-cycle delay unit, having an input point and an output point, wherein the input point is coupled to the transmitting end, and the half-cycle delay unit delays data from the input point by a half cycle of the synchronous clock, and outputs the data from the output point;
- an output contact; and
- a data directing unit, for coupling the output contact to the receiving end and coupling the output point to the input contact when receiving the return command, and coupling the input contact to the receiving end and coupling the output point to the output contact when not receiving the return command.

9. The bi-directional serial controller according to claim 8, wherein the data directing unit comprises:

- an input changeover switch, having a first end, a second end, and a third end, wherein the first end is coupled to the input contact;
- an output changeover switch, having a first pin, a second pin, and a third pin, wherein the first pin is coupled to the output contact, and the third pin is coupled to the output point and the third end; and
- a selector, having a first input end, a second input end, and an output end, wherein the first input end is coupled to the second pin, the second input end is coupled to the second end, and the output end is coupled to the receiving end,
- wherein when receiving the return command, the input changeover switch couples the first end to the third end, the output changeover switch couples the first pin to the second pin, and the selector couples the first input end to the output end, and when not receiving the return command, the input changeover switch couples the first end to the second end, the output changeover switch couples the first pin to the third pin, and the selector couples the second input end to the output end.

10. The bi-directional serial controller according to claim 8, wherein when the position signal is the odd signal, the synchronous clock generator outputs the external clock as the synchronous clock, and when the position signal is the even signal, the synchronous clock generator inverts the external clock and then outputs an inverted clock of the external clock as the synchronous clock.

11. The bi-directional serial controller according to claim 10, wherein the synchronous clock generator comprises:

a first inverter unit, for receiving and inverting the external clock, and then outputting the inverted clock of the external clock; and a selector, for outputting the external clock as the synchronous clock when the position signal is the odd signal, and taking the output of the first inverter unit as the synchronous clock when the position signal is the even signal.

12. The bi-directional serial controller according to claim 8, wherein the half-cycle delay unit comprises:

a second inverter unit, for inverting the synchronous clock; and a register, for receiving the data from the input point according to an inverted clock of the synchronous clock from the second inverter unit and outputting the data.

13. The bi-directional serial controller according to claim 8, wherein when the external clock is at a first rising edge (RE) and the input data is at the high level, the serial position detector outputs the odd signal as the position signal, otherwise the serial position detector outputs the even signal as the position signal.

14. The bi-directional serial controller according to claim 8, further comprising: a timeout detector, for outputting a reset signal to the serial register when the external clock satisfies a condition.

15. The bi-directional serial controller according to claim 14, wherein when the timeout detector outputs the reset signal and the external clock is at the high level, the serial position detector outputs the odd signal as the position signal, otherwise the serial position detector outputs the even signal as the position signal.

* * * * *